(No Model.)
F. MILLER.
SPRING FORK FOR BICYCLES.
No. 460,180. Patented Sept. 29, 1891.
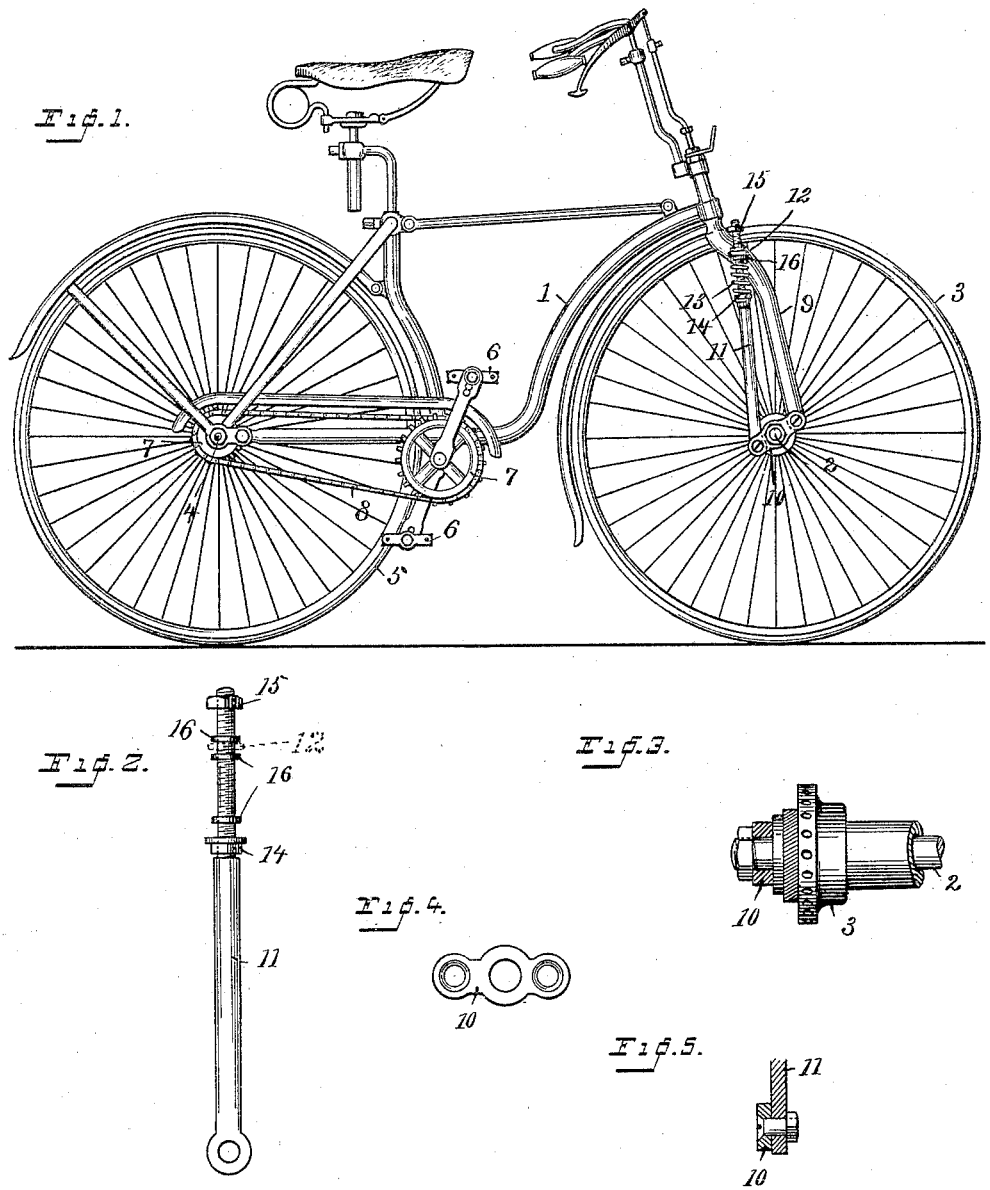
WITNESSES
C. M. Newman,
Arley I. Munson.
INVENTOR
Frank Miller
By H. M. Wooster, Atty.

UNITED STATES PATENT OFFICE.

FRANK MILLER, OF STAMFORD, CONNECTICUT.

SPRING-FORK FOR BICYCLES.

SPECIFICATION forming part of Letters Patent No. 460,180, dated September 29, 1891.

Application filed December 1, 1890. Serial No. 373,170. (No model.)

*To all whom it may concern:*

Be it known that I, FRANK MILLER, a citizen of the United States, residing at Stamford, in the county of Fairfield and State of Connecticut, have invented certain new and useful Improvements in Spring-Forks for Bicycles; and I do hereby declare the following to be a full, clear, and exact description of the invention, such as will enable others skilled in the art to which it appertains to make and use the same.

My invention has for its object to provide a spring-fork for bicycles, which will take up with perfect reliability and certainty the vibration between the front wheel and the handle-bar, which may be readily adjusted to carry any weight within reasonable limits, will be durable and practically impossible to break or get out of repair, and which, moreover, should both springs become broken, will still leave the machine as practical and serviceable as ever, the only difference being that the fork will be rigid instead of yielding.

With these ends in view I have devised the simple and novel spring-fork which I will now describe, referring by numerals to the accompanying drawings, forming part of this specification, in which—

Figure 1 is an elevation of a bicycle, showing the application thereto of my novel spring-fork; Fig. 2, a view of one of the rods detached; Fig. 3, a detail view of a portion of the hub and axle, showing one of the carriers in section; Fig. 4, a view of one of the carriers detached; and Fig. 5 is a detail sectional view showing the connection of the rod to the lever.

1 denotes the frame of a bicycle; 2, the front axle; 3, the front wheel; 4, the rear axle; 5, the rear wheel; 6, the pedals; 7, the sprockets; 8, the chain, and 9 the fork. These parts may all be of any ordinary or preferred construction, my invention being equally applicable to any of the various makes of bicycles.

The novel features of my invention are comprised in the special construction which I will now describe. The front axle is mounted in two armed carriers 10, and the arms of the fork, which embrace the front wheel in the usual manner, are pivoted to the ends of these carriers. At the other ends of said carriers, on the opposite side of the axle, are pivoted rods 11, which extend upward and pass freely through lugs 12 on the fork, the upper ends of said rods being screw-threaded, as shown.

13 denotes coil-springs surrounding the rods, the upper ends of said springs bearing against the lugs 12, and the lower ends against nuts 14 upon the rods. At the upper ends of the rods are placed other nuts 15. I have only shown a complete bicycle in elevation, it not being deemed necessary to make special views to show duplication of the parts. It should be understood, however, that carriers 10, rods 11, lugs 12, coil-springs 13, and the nuts 14 and 15 are duplicated on opposite sides of the machine.

16 denotes soft washers, made of leather, rubber, or other suitable material, which are placed between the springs and the lugs, between the springs and nuts 14, and also between the lugs and nuts 15, so as to insure perfectly noiseless operation of the parts.

In use when the front wheel strikes an obstruction, instead of the entire force of the blow being communicated to the fork and thence to the handle-bar, the carriers in which the wheel is mounted swing upon the pivots connecting them to the fork, which of course lifts the rods at the other ends of the carriers, so that the entire force of the blow is communicated to and is taken up by the coil-springs surrounding the rods. Should it be required at any time to increase the resiliency of the springs, nuts 14 are lowered, which increases the movement of the springs and gives greater elasticity to the action of the fork. In case the machine is used by a heavy rider, or if for any reason it is desired to have the action stiff, this result may be easily obtained by turning nuts 14 upward. It will be observed that nuts 15 serve as stops to limit the downward or return movement of the rods. These nuts, when once adjusted, do not require to be changed in use. The upper washers 16 serve at all times as a cushion to prevent shock to the machine should the upper nuts move down far enough to come in contact with the lugs. Should one of the springs break in use, the other spring, either with or without adjustment, will ordinarily be found to serve the purpose perfectly until a new spring can be put in. Should both springs break, however, the usefulness of the machine is in no way impaired. Nuts 14 are turned up until they come in contact with the washers 16 under the lugs. The machine then becomes practically a rigid-fork machine, as the only spring action will be that obtained from the washers. For all practical purposes, however, with the exception of the ease of riding secured by the spring action, the machine is as useful without the springs as with them, so that should both springs break on a long run the rider will still retain the full use of his machine.

Having thus described my invention, I claim—

1. The combination, with a bicycle-fork provided with lugs 12, of the wheel-carriers 10, pivoted at their forward ends to the lower ends of said fork and having bearings for the front-wheel axle 2 between their ends and rearward of their point of attachment to said fork, the rods 11, pivoted to the rear ends of said carriers and having screw-threaded upper ends passing through said lugs, the adjustable nuts 14 and 15 on said rods, the latter above said lugs, and the coil-springs 13, arranged between said nuts 14 and said lugs.

2. The combination, with a bicycle-fork provided with lugs 12, of the wheel-carriers 10, pivoted at their forward ends to the lower ends of said fork and having bearings for the front-wheel axle 2 between their ends and rearward of their point of attachment to said fork, the rods 11, pivoted to the rear ends of said carriers and having screw-threaded upper ends passing through said lugs, the adjustable nuts 14 and 15 on said rods, the latter above said lugs, the coil-springs 13, arranged between said nuts 14 and said lugs, and the elastic buffer-washers 16 between said nuts, lugs, and springs.

In testimony whereof I affix my signature in presence of two witnesses.

FRANK MILLER.

Witnesses:
  A. M. WOOSTER,
  ARLEY I. MUNSON.